United States Patent
Niemczyk

[11] Patent Number: 5,832,947
[45] Date of Patent: Nov. 10, 1998

[54] GAS SHUT-OFF AND PRESSURE RELIEF VALVE FOR A HIGH PRESSURE GAS VESSEL

[76] Inventor: Andrew Niemczyk, 11376 Sobieski St., Hamtramck, Mich. 48212

[21] Appl. No.: 786,091

[22] Filed: Jan. 17, 1997

[51] Int. Cl.⁶ .................................................. F16K 17/40
[52] U.S. Cl. ..................................... 137/68.23; 137/68.21; 251/127
[58] Field of Search ............................ 137/68.19, 68.21, 137/68.23; 251/127

[56] References Cited

U.S. PATENT DOCUMENTS

| | | |
|---|---|---|
| 3,467,120 | 9/1969 | Hill et al. . |
| 3,514,013 | 5/1970 | Wolf et al. . |
| 4,219,040 | 8/1980 | Fallon et al. ........................ 137/68.23 |
| 4,352,365 | 10/1982 | Boccardo et al. .................... 137/68.23 |
| 4,399,830 | 8/1983 | Brodie ................................. 137/68.21 |
| 4,479,587 | 10/1984 | Mundt et al. . |
| 4,505,180 | 3/1985 | Hinrichs . |
| 4,590,957 | 5/1986 | McFarlane . |
| 4,597,505 | 7/1986 | Mozley et al. . |

FOREIGN PATENT DOCUMENTS

| | | |
|---|---|---|
| 868221 | 3/1980 | U.S.S.R. . |
| 651017 | 3/1951 | United Kingdom ................ 137/68.23 |
| 878092 | 9/1961 | United Kingdom . |
| 2096703 | 10/1982 | United Kingdom . |

*Primary Examiner*—John Fox
*Attorney, Agent, or Firm*—Reising, Ethington, Learman & McCulloch

[57] ABSTRACT

A gas valve (10) includes a shut off valve mechanism (11) with a control stem having two annular grooves (54) that receive a deformed teflon sealing member (52) to seal the control stem against leakage. The gas valve (10) also includes a pressure relief valve (17) that includes a bursting disc (74) spaced from a cup shaped shield member (80) that has venting notches about its periphery and is spaced outboard of the bursting disc.

9 Claims, 3 Drawing Sheets

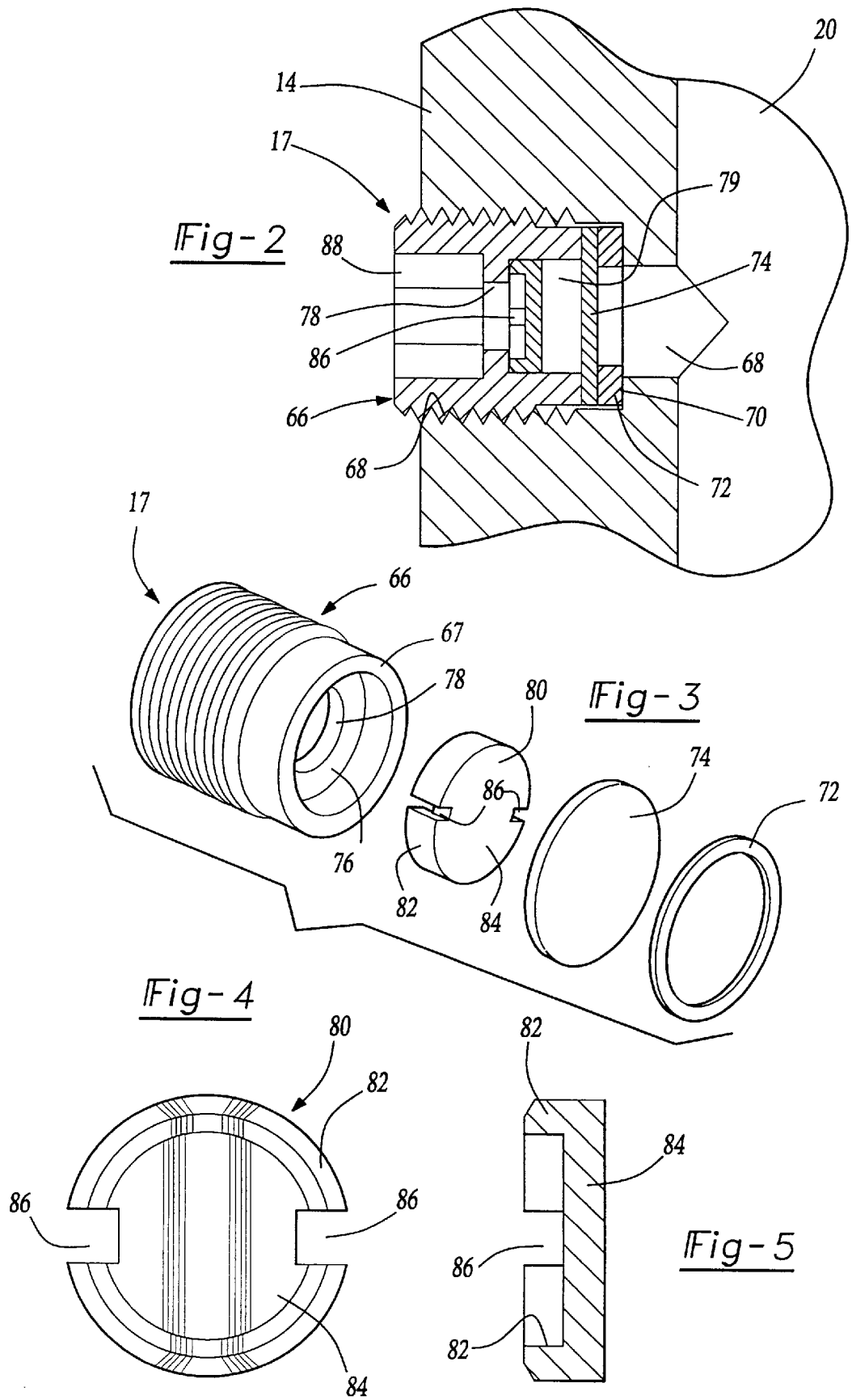

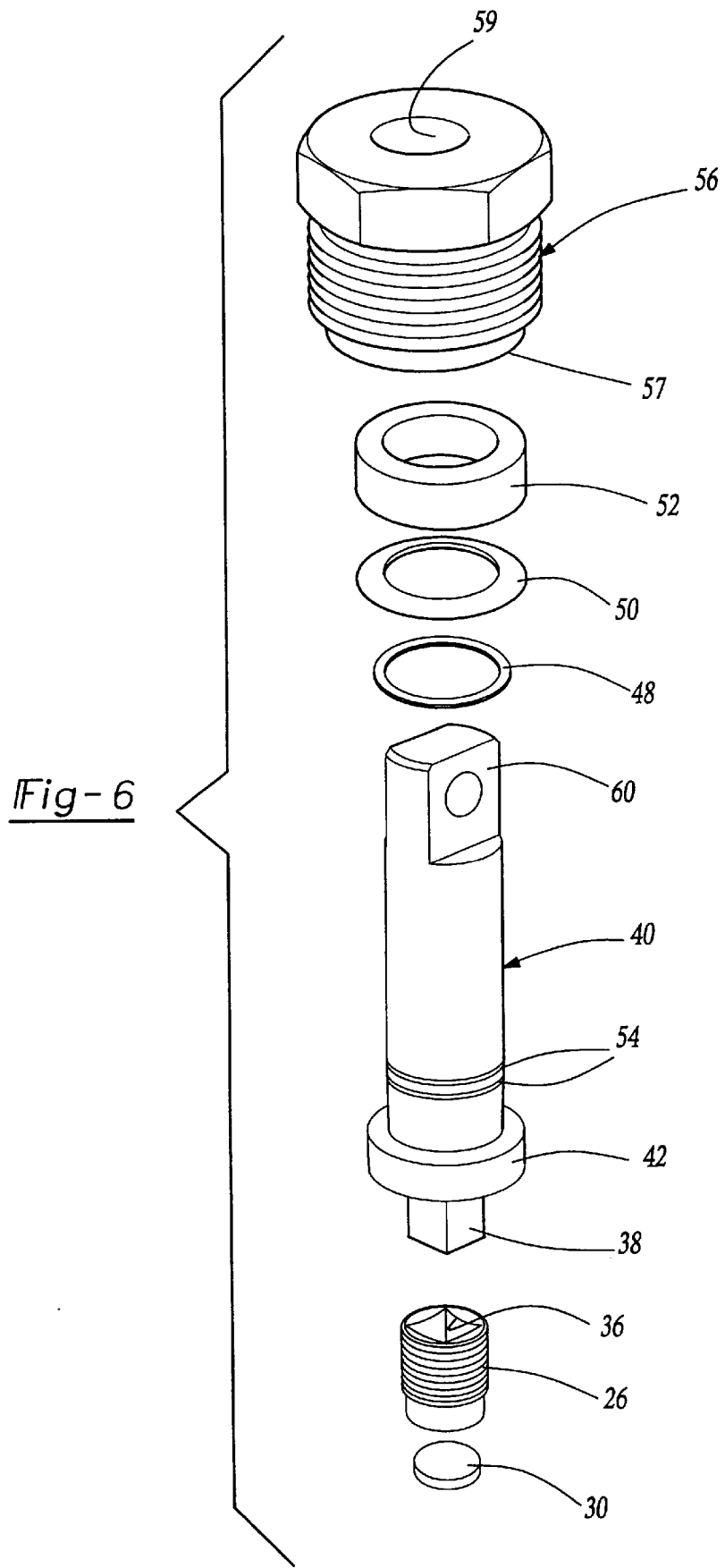

GAS SHUT-OFF AND PRESSURE RELIEF VALVE FOR A HIGH PRESSURE GAS VESSEL

TECHNICAL FIELD

The field of this invention relates to a valve for a high pressure gas cylinder.

BACKGROUND OF THE DISCLOSURE

Gas valves have long been used to control the flow out of a high pressure gas cylinder or other gas vessel. Gas valves have been utilized by both industry and hospitals for many years. The gas valve must provide a complete seal on the outlet port when the valve is in the closed position. Furthermore, most valves include a rotating stem that is mounted through a closure nut that in turn is threaded into a mounting aperture in the valve body. A seal must also be provided completely about the control stem with respect to the mounting aperture when the valve is in the open position to assure against leakage about the control stem and to direct all pressurized gas out through the proper connecting port.

In addition, the valve body must include an appropriate pressure relief device that is often called a rupture or bursting disc. One common type of bursting disc assembly includes a lead metal plug that is deformable through a hole in the body of the pressure relief device. The lead can separate from the body and be expelled by the high pressure gas from within the gas cylinder.

What is needed is an improved gas valve that incorporates a reliable yet inexpensive main valve assembly and a pressure relief device that is reliable with a reduced risk of expelling any solid fragment upon activation thereof.

SUMMARY OF THE DISCLOSURE

In accordance with one aspect of the invention, a valve has a body with an inlet boss mountable to a high pressure gas vessel A gas passage leads from the inlet boss to an internal valve seat in the valve body. A movable valve mechanism is mounted in an access opening of the body that selectively closes and opens the gas passage to allow gas flow to a connection exit port.

A pressure relief device has a body member mounted in a pressure relief port of the body and in communication with the passage. The body member of the pressure relief device has an internal annular shoulder with a passage therethrough. A shield member is mounted on an inboard side of the internal shoulder and constructed with at least one vent to allow gas to pass therethrough. A rupture disc is mounted against an internal end shoulder of the body member and has its central section spaced from the cup member. The rupture disc is pressed against a sealing ring that is mounted between the rupture disc and a radially extending shoulder of the pressure relief port.

Preferably, the shield member is a cup shaped member with an outer rim periphery mounted on the inboard side of the internal annular shoulder. The rim periphery has at least one notch therethrough to form the vent to allow gas to pass therethrough and into the passage through the internal annular shoulder. In one embodiment, each notch extends completely through the rim to form a cut-out with the radial depth of the cut-out on the cup shaped member being less than the width of the internal annular shoulder of the body member to provide a ortuous outlet path for the gas to the passage through the internal annular shoulder.

In accordance with another aspect of the invention, the valve mechanism includes a control stem with at least one annular groove thereabout. The access opening has an outwardly facing radial shoulder that mounts a spring washer about said stem. A deformable annular seal is mounted about the stem outboard of the spring washer and deformable under pressure to deform into each annular groove about the stem for forming a seal about the stem. The outer wall of the annular seal forms a seal with an internal wall of the access opening. A closure nut threadably engages with the access opening to exert deformable pressure onto the annular seal in conjunction with the spring washer to deform the annular seal into each annular groove. It is desirable that the annular seal is made from a low friction relatively inert material such as teflon.

In one embodiment, a drive end of the control stem is slidably received in a complementary shaped drive recess in a threaded valve plug that is threadably engaged within said valve body. A radially extending shoulder of the control stem is spaced axially apart from the valve plug when in the closed position. A low friction annular member is positioned on the control stem between the radially extending shoulder and the spring washer.

In accordance with another aspect of the invention, a pressure relief valve with the above described structure is mountable to a high pressure gas vessel.

BRIEF DESCRIPTION OF THE DRAWINGS

Reference now is made to the accompanying drawings in which:

FIG. 2 is an enlarged sectional view of the pressure relief valve shown in FIG. 1;

FIG. 3 is an exploded perspective view illustrating the separate elements of the pressure relief valve shown in FIG. 2;

FIG. 4 is an enlarged and sectional of the shield cup shown in FIG. 2;

FIG. 5 is a top plan view of the shield cup shown in FIG. 4; and

FIG. 6 is an exploded perspective view of the movable valve stem assembly members shown in FIG. 1.

DETAILED DESCRIPTION OF THE PREFERRED EMBODIMENT

Figure 1:
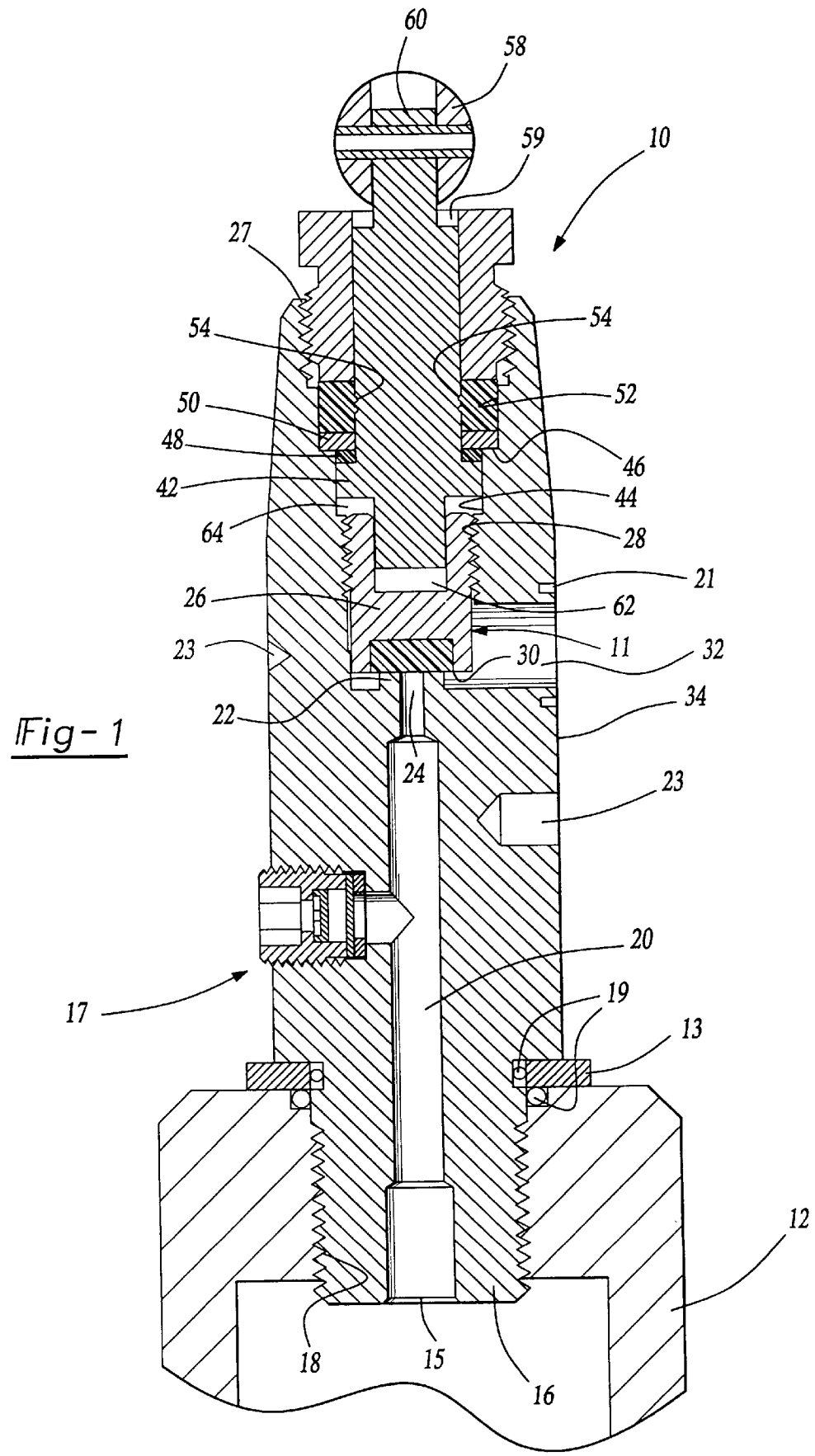
FIG. 1 is a side elevational and sectional view of a gas shut-off valve in accordance with one embodiment of the invention.

Referring now to FIG. 1, a gas valve 10 for a high pressure gas vessel 12 has a shut off valve mechanism 11 and a pressure relief check valve 17 housed therein. The gas valve has a body 14 with an inlet port 15 through a threaded boss 16 that threadably engages to the top opening 18 in the gas vessel 12. The gas vessel can be a commercially available oxygen gas cylinder for use to supply oxygen for medical patient use. The port 15 leads to a gas passage 20 extending in the body 14. An appropriate mounting ring 13 and O-rings 19 are mounted between the vessel 12 and body 14.

An internal valve seat 22 surrounds a valve port 24 at a downstream end of the passage 20. The passage 20 is selectively opened and closed by the movable gas valve mechanism 11 to selectively open or close the passage to connection exit port 32 that exits through a side 34 of body 14. Conventionally positioned recesses 23 and grooves 21 are in body 14 to accommodate attachment of commercially available regulators (not shown).

The movable gas valve mechanism 11 is mounted through an access opening 27 at the top of the body 14. The valve mechanism 11 which has its elements illustrated in FIG. 6 includes a threaded valve plug 26. The plug 26 is threadably engaged to internal threads 28 in body 14 and has a sealing insert 30 selectively sealingly engageable to the valve seat 22 to open or shut the passage 20. The valve plug 26 has a drive recess 36 that slidably receives a drive section 38 of a control stem 40. The top end of the drive section 38 ends in a radially extending flange 42 that fits within a bore section 44 situated below an outwardly facing shoulder 46 in the access opening 27. A low friction annular ring 48 is positioned above the flange 42. A bevel washer 50 acting as a spring washer is mounted on the outwardly facing shoulder 46. A low friction annular sealing member 52 is positioned about the control stem above the washer. The annular sealing member 52 is made from teflon material that is deformable and is relatively inert with respect to oxygen or other gas within vessel 12.

The control stem 40 has two annular grooves 54 that are axially positioned to be opposite the annular sealing member 52. An externally threaded closure nut 56 threadably engages the access opening 27 with control stem extending through its center aperture 59. The closure nut 56 as it is tightened into access hole 27 has its internal end 57 pressed against the annular sealing member 52 and forces the member 52 to deform into the annular grooves 54. The deformation provides sealing between the sealing member 52 and both the stem 40 and the body 14 about access opening 27. The bevel spring washer is also flexed to provide a continuous force onto the sealing member 52 to maintain pressure thereon. An appropriate handle 58 is connected to distal section 60 of the control stem 40 to operably rotate the control stem 40.

Rotation of the control stem 40 moves the valve plug 26 up and down to selectively open the valve port 24 to the connection exit port 32. The valve plug 26 can axially move relative to the control stem because of the provided space 62 and annular space 64 between the plug 26 and stem 40.

The deformation of the annular sealing member 52 provides for an expeditiously constructed shut-off valve that is reliably leak free even in view of high pressures encountered in commercially available high pressure gas vessels.

The valve body 14 also houses the pressure relief valve 17 that is further illustrated in FIGS. 2–5. The pressure relief valve 17 has a threaded body 66 that threadably engages within a side port 68 that is in fluid communication with gas passage 20. The side port has a radially extending shoulder 70 that seats an annular sealing ring 72. A rupture disc 74 made from a thin deformable sheet of brass seats on the outboard side of sealing ring 72. The body 66 is threaded into the port 68 with an end shoulder 67 of the body to tightly press the rupture disc 74 against the sealing ring 72. The body 66 has a bore 78 therethrough with an internal facing shoulder 76 that seats a cup shaped shield member 80. The shield member 80 is spaced from the rupture disc 74 with space 79. The shield member 80 has a rim section 82 and a central area 84. Two opposing notches 86 are cut through the rim and into the central area 84 to form vents. The total depth of the notches into the central area 84 is less that the width of the annular shoulder 76. In other words inboard edges of each notch is outboard of the periphery of the bore 78 through the shoulder 76. In this fashion a tortuous non-straight path is presented from space 79 and through the shield member 80 and outlet bore 78. The outer end 88 of bore 78 has a hex shaped cross-section to receive an Allen wrench.

During normal operation, the bursting disc 74 is strong enough to withstand the normal high gas pressures within passage 20 that is in direct communication with the interior of gas vessel 12. The seal 72 provides against leakage. If for some reasons, the gas pressure exceeds a predetermined amount such as 3,500 p.s.i., the brass rupture disc 74 will deform into the space 79 and rip to allow the gas from passage 20 to vent through the space 79, through notches 86 and out of venting bore 78. Space 79 is long enough to assure bursting of disc 74 and to prevent the brass from bottoming out on shield 80. The rupture disc will normally rip to allow the gas to vent outward. If the disc fragments, the relatively small size of notches 86 and the tortuous path for venting gas will further reduce the risk of any such broken fragments of the bursting disc 76 from exiting the pressure relief valve body 66 while still providing adequately quick venting of the gas from vessel 12.

The rupture disc can be precisely dimensioned to deform and rip at precise predetermined gas pressures. The shield is dimensioned to be stronger and withstand deformation at the release pressure of the rupture disc. As such, a reliable pressure relief valve that consistently activates at a predetermined pressure is expeditiously constructed and reduces the risk of expelled projectiles from the valve.

Variations and modifications are possible without departing from the scope and spirit of the present invention as defined by the appended claims.

The embodiments in which an exclusive property or privilege is claimed are defined as follows:

1. A gas valve for a high pressure gas vessel; said valve including a body having an inlet mountable to a high pressure gas vessel, a passage leading from said inlet to an internal valve seat about a valve port at a downstream end of the passage which is selectively in communication with a connection exit port in the body, a movable valve mechanism mounted in an access port of the body that selectively closes and opens the valve port to the connection exit port, a pressure relief device having a body member mounted in a pressure relief port of said body and in communication with said passage, the improvement characterized by:

said body member of said pressure relief device having an internal annular shoulder with a passage therethrough;

a shield member mounted on an inboard side of said internal shoulder and constructed with a vent to allow gas to pass therethrough;

a rupture disc mounted against an internal end shoulder of said body member and having its central section spaced from said shield member;

a sealing ring mounted between said rupture disc and a radially extending shoulder of said pressure relief port.

2. A gas valve as defined in claim 1 further characterized by:

said shield member being a cup shaped member with an outer rim periphery mounted on said inboard side of said internal annular shoulder;

said vent being at least one notch through said rim periphery to allow gas to pass therethrough and into said passage through said internal annular shoulder.

3. A gas valve as defined in claim 2 further characterized by:

said at least one notch extending completely through said rim to form a cut-out with the depth of said cut out on said shield member being less than the width of said internal annular shoulder of said body member.

4. A gas valve as defined in claim 1 further characterized by:

said valve mechanism including a control stem with at least one annular groove thereabout;

said access port having an outwardly facing radial shoulder;

a spring washer mounted about said stem and on said outwardly facing shoulder;

a deformable annular seal mounted about said stem outboard of said spring washer and deformable under pressure to deform into said at least one annular groove about said stem for forming a seal about said stem and with an internal wall of said access port;

a closure nut threadably engageable with said access port to exert deformable pressure onto said annular seal in conjunction with said spring washer.

5. A gas valve as defined in claim 4 further characterized by:

said deformable annular seal being made from teflon material.

6. A gas valve as defined in claim 5 further characterized by:

a drive end of the control stem slidably received in a threaded valve plug that is threadably engaged within said valve body;

a radially extending shoulder of said control stem is spaced axially apart from said valve plug when in the closed position; and a low friction annular member is positioned on said control stem between said radially extending shoulder and said spring washer.

7. A pressure relief valve for a high pressure gas vessel, said relief valve characterized by:

a body member having an internal annular shoulder with a passage therethrough;

a shield member mounted on an inboard side of said internal shoulder and constructed with a vent to allow gas to pass therethrough;

a rupture disc mounted against an internal end shoulder of said body member and having its central section spaced from said shield member;

a sealing ring mountable between said rupture disc and a radially extending shoulder of a pressure relief port in a high pressure gas vessel.

8. A pressure relief valve as defined in claim 7 further characterized by:

said shield member being a shaped member with an outer rim periphery mounted on said inboard side of said internal annular shoulder;

said vent being at least one notch through said rim periphery to allow gas to pass therethrough and into said passage through said internal annular shoulder.

9. A pressure relief valve as defined in claim 8 further characterized by:

said at least one notch extending completely through said rim to form a cut-out with the depth of said cut out on said shield member being less than the width of said internal annular shoulder of said body member.

* * * * *